United States Patent
Wruck

(10) Patent No.: US 7,434,413 B2
(45) Date of Patent: Oct. 14, 2008

(54) INDOOR AIR QUALITY AND ECONOMIZER CONTROL METHODS AND CONTROLLERS

(75) Inventor: Richard A. Wruck, Mount Prospect, IL (US)

(73) Assignee: Honeywell International Inc., Morristown, NJ (US)

( * ) Notice: Subject to any disclaimer, the term of this patent is extended or adjusted under 35 U.S.C. 154(b) by 448 days.

(21) Appl. No.: 11/032,460

(22) Filed: Jan. 10, 2005

(65) Prior Publication Data

US 2006/0150644 A1   Jul. 13, 2006

(51) Int. Cl.
F25B 49/00 (2006.01)
F25B 29/00 (2006.01)
F25D 17/04 (2006.01)

(52) U.S. Cl. ............... 62/126; 62/186; 165/251; 454/333; 236/49.3

(58) Field of Classification Search ......... 165/250–251; 62/DIG. 22, 126, 186; 454/333; 236/49.3
See application file for complete search history.

(56) References Cited

U.S. PATENT DOCUMENTS

| | | | |
|---|---|---|---|
| 5,276,630 A * | 1/1994 | Baldwin et al. | ............ 700/276 |
| 5,292,280 A | 3/1994 | Janu et al. | |
| 5,801,940 A | 9/1998 | Russ et al. | |
| 6,006,142 A * | 12/1999 | Seem et al. | ............ 700/276 |
| 6,161,764 A | 12/2000 | Jatnicks et al. | |
| 6,223,544 B1 | 5/2001 | Seem | |
| 6,609,967 B2 | 8/2003 | Sharp et al. | |
| 2002/0072322 A1 * | 6/2002 | Sharp et al. | ............ 454/229 |
| 2004/0222307 A1 | 11/2004 | DeLuca | |

OTHER PUBLICATIONS

Honeywell, Honeywell Hvac—economizer study, http://content.honeywell.com/building/components/pr/econstudy.asp. 3 pages, printed Oct. 21, 2004.
Honeywell, Fresh Air Economizer™ Systems, 2 pages, 1999.

* cited by examiner

Primary Examiner—Marc E Norman

(57) ABSTRACT

Supervisory controllers, and methods, for use in a coordinated IAQ and economizer system. Various control objectives are defined and met. Some illustrative control objectives include economizer control, sequencing of economizer free cooling with compressor driven cooling, indoor air quality and FAV aims, demand ventilation settings, system protection from low temperatures, and smoke, supervisory and fault tolerance commands. The controller may be self configuring. A tiered fault tolerant controller is also provided. An illustrative controller is configured to determine whether various system sensors and devices are operational. The illustrative controller is also configured to perform a first method when all system sensors and/or devices are functioning, and at least a second method in response to sensor or device failures. The supervisory controller may include integrated economizer control, or may be configured as a separate controller. Supervisory controllers configured for use with specialized controllers are also illustrated.

6 Claims, 13 Drawing Sheets

Economizer Modes:
Open: Outdoor air dampers commanded full open
Closed: Outoor air dampers commanded full closed
Modulate: Outdoor air dampers allowed to modulate based on ventilation, IAQ, and cooling objectives.

INDOOR AIR QUALITY AND ECONOMIZER CONTROL METHODS AND CONTROLLERS

FIELD

The present invention is relation to the field of heating, ventilation, and air conditioning (HVAC). More particularly, the present invention relates to controllers and control methods for indoor air quality and economizer-equipped systems.

BACKGROUND

HVAC systems incorporating fresh air return and indoor air quality controls create a number of options for air quality control. The use of outdoor air for ventilation creates the possibility of providing thermal (often cooling) control through the use of ambient air, rather than artificially changing temperatures. It is widely believed that, usually, infusion of outdoor air into a controlled space provides health and comfort benefits. However, controls over temperature, fresh air infusion, humidity, and air quality can each present sometimes conflicting aims and needs. Further, as the system becomes more complex, more sensors and devices are used in the HVAC system. With increased numbers of sensors and devices comes a greater likelihood of failure or malfunction, preventing effective implementation of desired strategies that rely on information or operation of sensors or devices that have failed.

SUMMARY

The present invention, in an illustrative embodiment, includes a supervisory controller for use in a coordinated indoor air quality (IAQ) and economizer system. Various control objectives are defined and met. Some illustrative control objectives include economizer control, sequencing of economizer free cooling with compressor driven cooling, indoor air quality and fresh air ventilation (FAV) aims, demand ventilation settings, system protection from low temperatures, and/or smoke, supervisory and fault tolerance commands. The controller may be self configuring. Methods associated with such a supervisory controller are also contemplated.

In some embodiments, a tiered fault tolerant controller is provided. An illustrative controller is configured to determine whether various system sensors and devices are operational. The illustrative controller is also configured to perform a first method when all system sensors and/or devices are functioning, and at least a second method in response to sensor or device failures.

The supervisory controller may include an integrated economizer control, or may be configured as a separate controller.

DETAILED DESCRIPTION

The following detailed description should be read with reference to the drawings. The drawings, which are not necessarily to scale, depict illustrative embodiments and are not intended to limit the scope of the invention.

Economizer control generally refers to methods and systems wherein economic solutions to thermal needs of a controlled space are met. For example, economizer control may allow cool outside air infusion into a controlled space to reduce indoor air temperature, when available, as a substitute for (or supplement to) operation of an associated air conditioning system. In such a mode, energy consumption can be reduced. Though cooling economizer modes are more likely, heating economizers can also be used. As used herein, "free cooling" and "free heating" refer to modes of operation that are economizer modes wherein infusion of outdoor air to effect indoor temperature change is used to effect (or aid) cooling or heating. When free cooling or free heating is disabled, other considerations, such as ventilation goals, are relied upon more strongly to determine how much fresh air infusion is allowed.

Outdoor air or fresh air ventilation (FAV) can be used to improve indoor air quality. Some systems make use of goals for FAV relating to occupancy, floor space, volume, drafts, etc. Some illustrative goals are discussed in ASHRAE 62.2, which provides a number of minimum FAV goals based on one hour, three hour, and twenty-four hour time blocks. An illustrative FAV control method is shown and described in copending and commonly assigned U.S. patent application Ser. No. 10/758,838, entitled FRESH AIR VENTILATION CONTROL METHODS AND SYSTEMS.

Demand ventilation is a further aspect of FAV, often including a sensor or user-enabled settings that determine whether and when fresh air should be vented into a controlled space. One example of demand ventilation is a system having a carbon dioxide sensor, used as a surrogate for an occupancy sensor, which may call for FAV when $CO_2$ levels rise above a setpoint.

Figure 1:
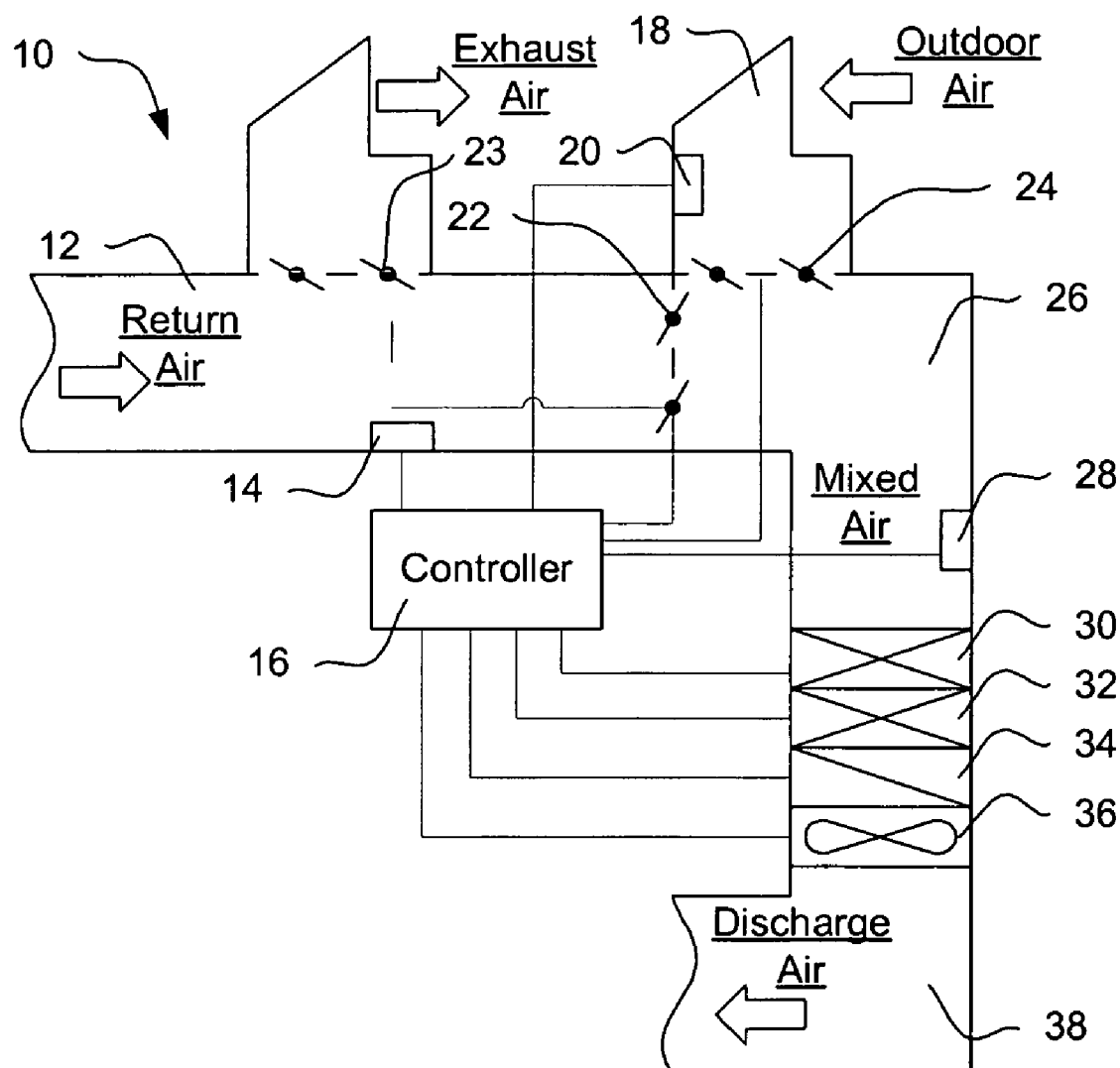
FIG. 1 shows the interconnection of several components for an HVAC system.

FIG. 1 shows the interconnection of several components for an illustrative HVAC system. The system 10 includes a return air plenum 12 with a corresponding return air (RA) sensor 14 placed for sensing one or more RA characteristics. The RA sensor 14 may be, for example, an enthalpy sensor, a temperature (dry bulb) sensor, a pressure sensor, or any other suitable sensor. In some examples, the RA sensor 14 may also include a carbon monoxide (CO), carbon dioxide ($CO_2$), particulate, or other air quality sensor. In some embodiments, multiple sensing elements may make up RA sensor 14. In the illustrative embodiment, the RA sensor 14 is coupled to a controller 16.

An outdoor air plenum 18 is adjacent an outdoor air vent allowing outside air to be pulled into the system 10. A corresponding outdoor air (OA) sensor 20 may be provided for sensing one or more OA characteristics. The OA sensor 20 may be, for example, an enthalpy sensor, a temperature (dry bulb) sensor, a humidity sensor, a pressure sensor, or any other suitable sensor. In some examples, the OA sensor 20 may also include a CO, $CO_2$, particulate, or other air quality sensor. The OA sensor 20 may be made up of multiple sensing elements. In the illustrative embodiment, the OA sensor 20 is also coupled to the controller 16. The OA sensor 20 may also include a ventilation air flow sensor configured to determine whether and/or how much air is flowing through the OA plenum 18.

Also shown are an RA damper 22 and an OA damper 24. An equalizing damper 23 is shown. The equalizing damper 23 may be used to equalize pressure within the system, making infusion of outside air easier by allowing return air to exit the structure. The equalizing damper 23 may also be used as a purge damper. For example, fully opening the equalizing damper 23 and OA damper 24, while closing the RA damper 22 and running the fan 36, replaces inside air with outside air. In the illustrative embodiment, the dampers 22, 23, 24 control the flow of air through the system 10. The dampers 22, 23, 24 are also coupled to the controller 16.

A mixed air plenum 26 may include a mixed air (MA) sensor 28. As with the other sensors 14, 20, the MA sensor 28 may be of a variety of types, for example, an enthalpy sensor, a temperature (dry bulb) sensor, a humidity sensor, a pressure sensor, or any other suitable sensor. In some examples, the MA sensor 28 may also include a CO, $CO_2$, particulate, or other air quality sensor. The MA sensor 28 may be made up of multiple sensing elements. The MA sensor 28 is shown coupled to the controller 16.

Downstream of the MA sensor 28 are heating heat exchangers 30, 32, cooling heat exchanger 34, and fan 36, which forces air from the mixed air plenum 26 into the discharge air plenum 38 leading into an associated ventilation system for a building. While a two stage heating system is shown (including a first stage heating heat exchanger 30 and a second stage heat exchanger 32), the present invention may also be used with single stage systems, or with systems having more than two stages. Likewise, additional cooling heat exchangers 34 may be provided for multi-stage cooling, as desired. Though not shown, the discharge air plenum 38 may also be provided with one or more sensors including, for example, temperature, enthalpy, humidity, pressure sensors, and or any other suitable sensors including, for example, other air quality sensors.

In operation, the fan 36 will usually operate whenever any of the heat exchangers 30, 32, 34 and associated components are activated to provide heating/cooling heat exchange capacity. The fan 36 may be placed downstream or upstream of the heat exchangers. When the fan 36 is activated, the RA damper 22 may be opened to allow air circulation, and the OA damper 24 opened/modulated to allow fresh air infusion. If an exhaust/purge damper and vent are provided, these may also be opened to allow exhaust in conjunction with fresh air infusion through the OA damper 24.

The example HVAC system of FIG. 1 is merely illustrative, and the present invention is not limited to the configuration or elements shown. For example, in some embodiments, the OA and RA dampers 22, 24 are physically connected to be, in essence, a single large damper that is addressed by the controller as a single unit, rather than as separate units as shown in FIG. 1.

While an economizer mode can be used for heating, it is typically used instead for cooling. In a cooling economizer mode (or "free cooling" mode), OA characteristics are compared to desired internal characteristics to determine whether fresh air infusion will provide cooling. Several types of economizer operation can be used. One model is a differential enthalpy model. Using differential enthalpy, for example, if the OA enthalpy is low relative to the RA enthalpy, the OA damper 24 is opened to enable use of outside air to cool a controlled space. Another model uses a comparison of OA enthalpy to a setpoint representing a line on the psychometric chart. A third model uses OA dry bulb characteristics (temperature only) and compares these to a setpoint which may be set in advance or may rely on a thermostat setpoint. Studies have shown that differential enthalpy is the most efficient of these three, with single OA enthalpy next, and OA temperature least efficient of the three.

For some embodiments of the present invention, whether the RA and OA sensors are each functioning affects whether a differential economizer mode is used. For example, if only OA sensors are functioning a setpoint economizer mode may be used instead of differential economizer methods. For some embodiments, if OA sensors are not functional, an economizer mode is chosen as a "default" because it may be presumed that OA characteristics will typically support efficient economizer operation. In other embodiments, a non-economizer mode is chosen because OA characteristics may not be expected to support efficient economizer operation. If desired, other sensors such as the MA sensors or sensors provided in the discharge air plenum 38 may be used as surrogates to determine the temperature/enthalpy effects of infused outside air during economizer operation.

As noted above, various fresh air ventilation targets or goals can be set, for example, goals based on the ASHRAE 62.2 standard. OA infusion occurring as a result of an economizer mode can count toward such fresh air ventilation goals. Further, if desired, a demand control ventilation method may be incorporated as well. Demand control can be effected using one or more carbon dioxide sensors placed to detect $CO_2$ levels in an occupied space. The $CO_2$ level typically correlates well with human occupancy levels in a controlled space. A $CO_2$ "setpoint" can be used to determine whether additional fresh air ventilation is desirable. Such demand control, or fresh air ventilation goals, can be used to allow fresh air infusion through the OA damper 24 over and above that which occurs as a result of economizer decisions.

FIGS. 2A-2C, 3A-3B, and 4, 5A-5B, and 6-8 show in block form an illustrative HVAC operation method. The various portions of this method may be used in conjunction with one another, or may be used separately from other aspects of the illustrative method, as desired. While a relatively complete example is given, the various aspects of the present invention may be used separately, as defined by the appended claims.

The illustrative method, or parts thereof, may be performed periodically, for example, at intervals ranging from one second to one minute, though shorter and longer intervals may of course be used. Various elements are noted herein and given ranges, for example, delays of 30 and 90 seconds are noted. The length of such time periods is merely illustrative, and may be changed and remain within the scope of the present invention. In an illustrative embodiment, the methods shown below are repeated at intervals to not only provide an initial configuration for HVAC operation, but to also provide for reconfiguration during operation in the event that one or more components (such as the sensors) fail during operation. As shown below in FIG. 8, such failures may be annunciated. The present methods, in illustrative embodiments, may enhance continued operation despite such failures until annunciated failures can be remedied.

Figure 2A:
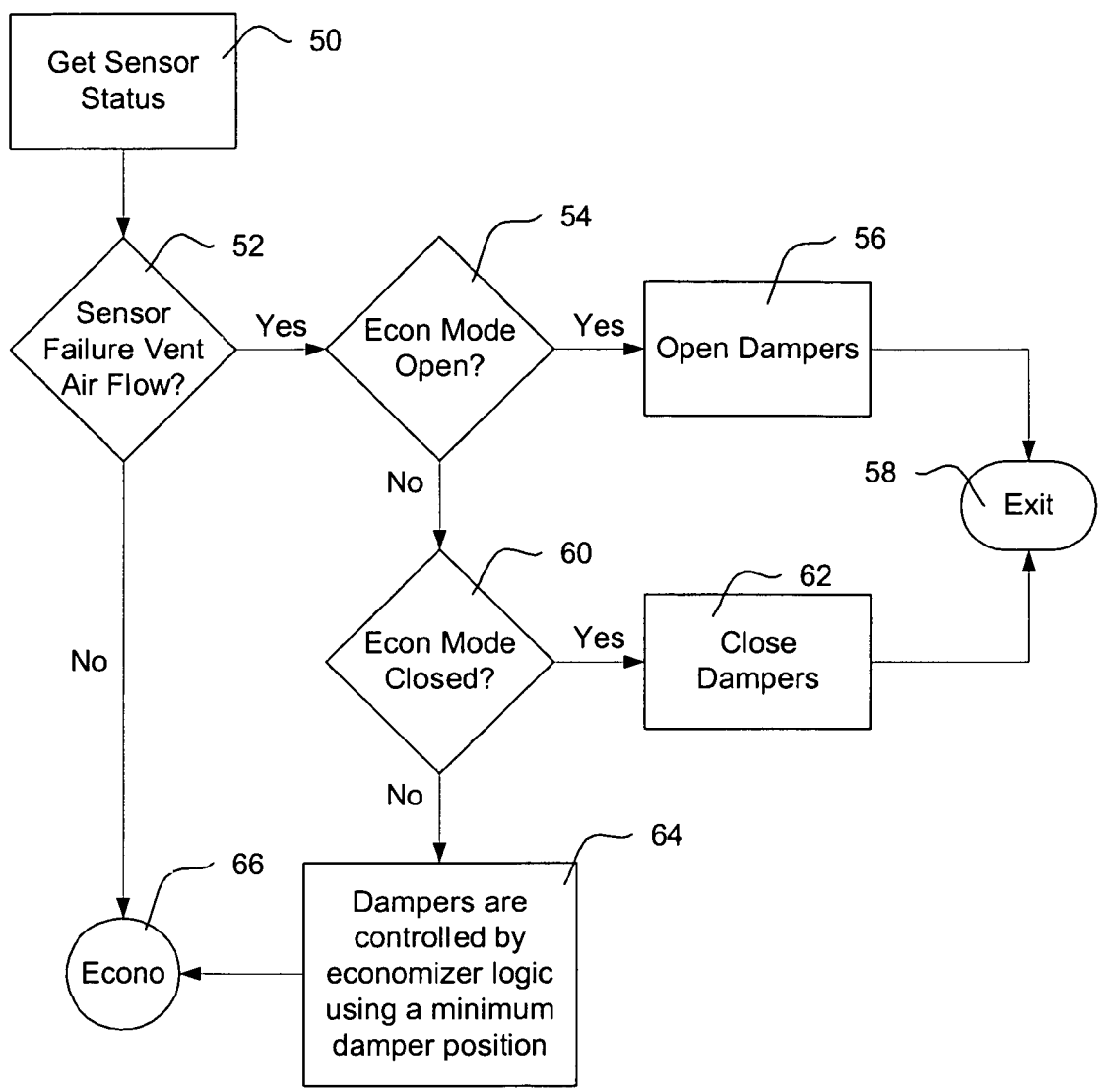
FIGS. 2A-2C are block diagrams showing a fault tolerance portion of an illustrative HVAC operation method.
Figure 2B:
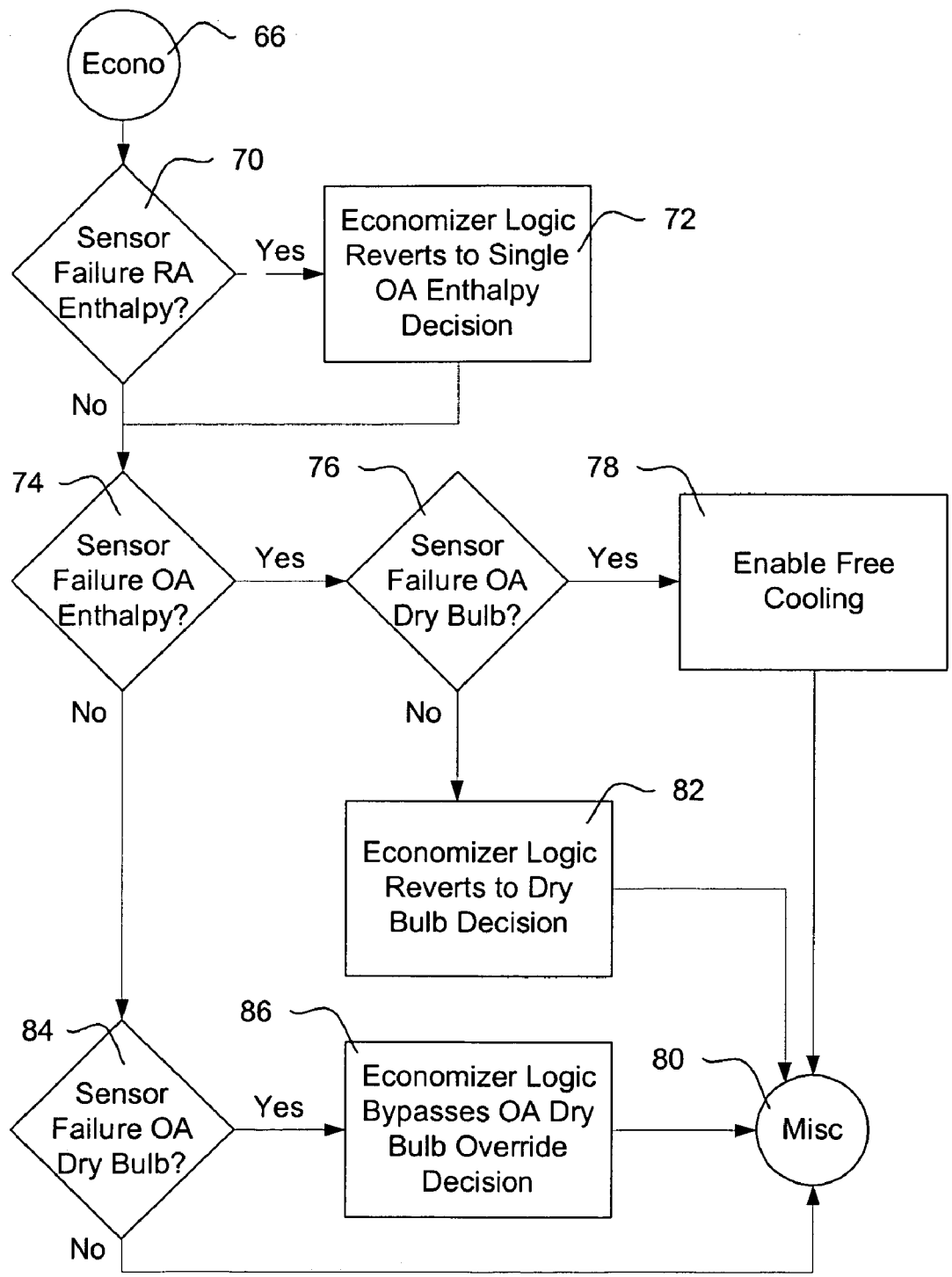
Figure 2C:
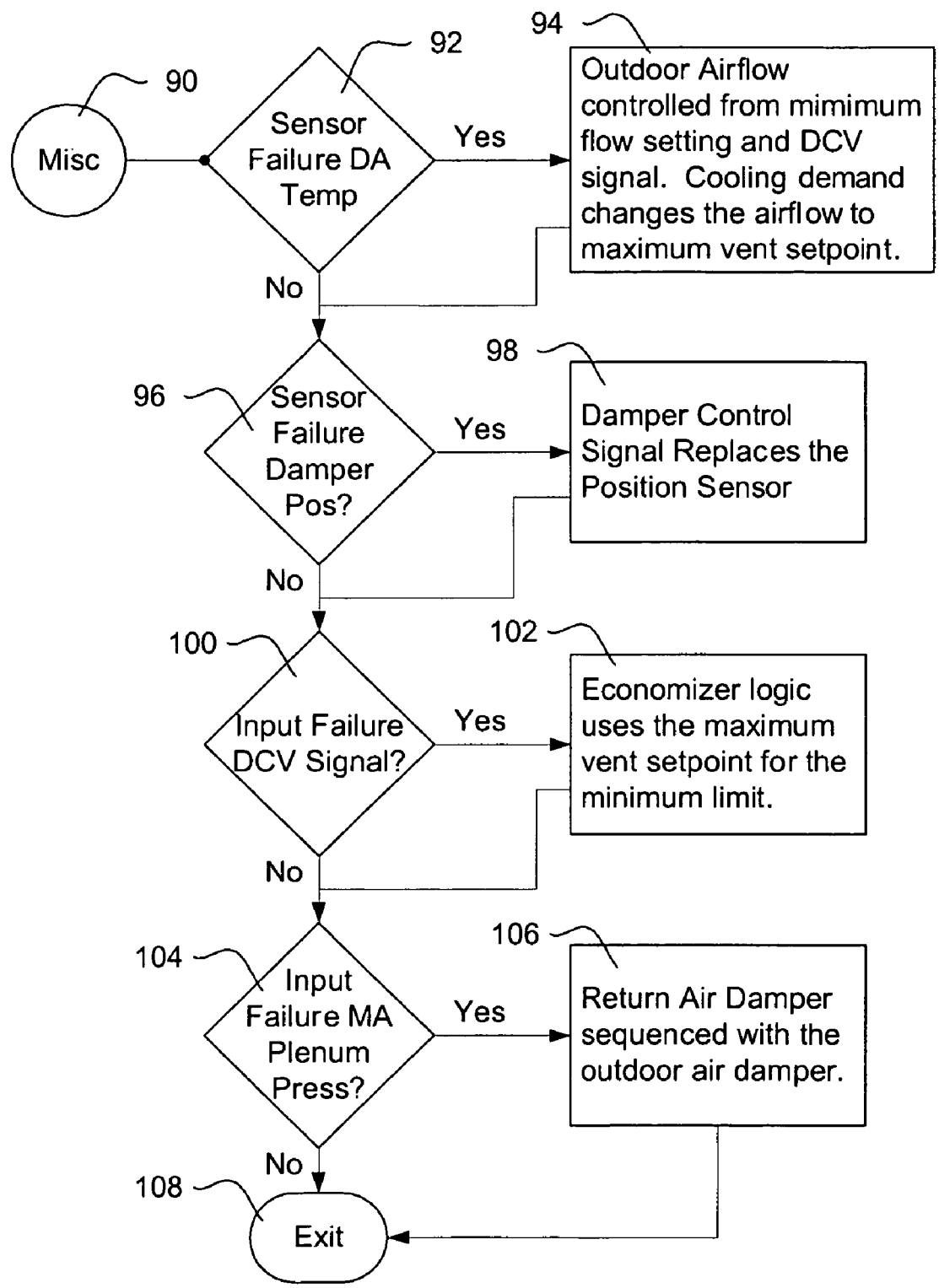

FIGS. 2A-2C are block diagrams showing a fault tolerance portion of an illustrative HVAC operation method. The method begins with getting sensor status 50. A first check is whether there is a failure in the vent air flow sensor 52. The vent air flow sensor is used to monitor the amount of air flow coming in from the outside. If this sensor fails, the extent of economizer control over air flow may be reduced. If there is a vent flow sensor failure, the next method step is to check the economizer mode. First, if the economizer mode is open, as shown at 54, the outside air dampers are opened as shown at 56, and the fault tolerance portion is completed, as shown at 58. If, instead, the economizer mode is not open, whether the economizer mode is closed is checked as shown at 60. If so, the outside air dampers are closed as shown at 62 and the method is done, as shown at 58. If the economizer mode is neither open nor closed, then it is assumed to be in a modulate mode where outdoor air dampers are allowed to modulate based on ventilation, indoor air quality (IAQ) and/or cooling objectives, as noted at 64. From step 64, or if there is no sensor failure for the vent flow sensors, the method continues with econo 66, in FIG. 2B.

Referring now to FIG. 2B, from econo 66, a next step is to observe whether there is a failure with the RA enthalpy sensor, as shown at 70. If so, the economizer logic is set to use a single OA enthalpy decision, as shown at 72. In either event, the next step is to determine whether there is a sensor failure with the OA enthalpy sensor, as shown at 74. If so, an enthalpy decision cannot be made by the economizer. Therefore the next step is to check whether there is a sensor failure for the OA dry bulb temperature sensor, as shown at 76. If so, then free cooling is enabled as shown at 78, using the assumption that, generally, outside air conditions will allow free cooling to be economically efficient. Such an assumption may be made, for example, in cooler climates where disabling the economizer due to warm/humid outside air conditions occurs infrequently. In an alternative embodiment economizer operation may be disabled, for example in a hot and muggy climate where economizer operation is frequently disabled. The method continues at misc in FIG. 2C, as shown at 80.

Going back to 76, if there is no failure for the OA dry bulb sensor, then the economizer logic reverts to a dry bulb (temperature) decision as shown at 82. The dry bulb decision may include comparing the outdoor temperature to a setpoint. The method again goes to misc 80. Going back to 74, if there is no failure for the OA enthalpy sensor, the method continues by determining whether there is an OA dry bulb sensor failure, as shown at 84. If so, the economizer logic may bypass the OA dry bulb override decision, as shown at 86. An OA dry bulb override decision may be included to assure that outside air is not infused by the economizer when the OA temperature exceeds the RA temperature or a high OA temperature setpoint. This may occur, for example, in very dry outdoor conditions where OA enthalpy is low compared to RA enthalpy even though OA temperatures are higher than RA temperatures. If there is an OA dry bulb sensor failure at 84, the override is bypassed at 86 and the method again goes to misc 80. Otherwise, the method goes directly from step 84 to misc 80.

Other embodiments may include monitoring whether other sensors are operational as well. For example, a comparison of conditions in the MA plenum to those in the RA plenum may provide a surrogate indication of whether OA conditions are suitable for economizer operation. Thus, a further economizer operation may be selected after a determination of whether MA and/or RA plenum sensors (enthalpy or dry bulb, for example) are functional. It is also contemplated that fewer or other sensors may be checked and/or that the sensors may be checked in a different order.

Referring now to FIG. 2C, starting with misc 90, the method continues by checking for additional sensor failures. As shown at 92, the discharge air temperature sensor is checked for failures; if there is a failure here, the outdoor airflow is controlled using a minimum flow setting as shown at 94. The demand control signal (DCV) and cooling needs can then be used to modulate ventilation using the OA damper.

Next, the damper position sensors are checked for failures, as shown at 96. If there is a sensor failure with the damper position sensor(s), then the system instead uses the damper control signal, as noted at 98. For example, a damper having modulation between open and closed may receive a damper control signal between 2-10 volts dc, or in other embodiments, anywhere from 0-24 volts. The assumed damper position, if the position sensor fails, may be selected as a function of the damper control signal. Then the input for demand control ventilation is checked for failures, as shown at 100. For example, if a $CO_2$ sensor is used to provide data for demand control ventilation, if the sensor fails, the method will go to step 102. As shown at 102, the economizer logic will use the maximum ventilation setpoint as its minimum ventilation limit. Thus, the economizer logic assumes maximum ventilation is required, e.g., there is maximum anticipated occupancy. In other embodiments, the economizer may assume a different occupancy level and use a different vent setpoint as its minimum ventilation setpoint.

When the mixed air plenum pressue sensor is operation, the RA damper may be controlled to maintain a minimum pressure difference between the OA pressure and the MA plenum pressure, to assure that ventilation air is pulled from outdoors. The system may be configured to accommodate fault-proofing this aspect of the system. As shown, the plenum pressure sensor for the mixed air plenum is checked to see if it has failed, as shown at 104. If so, the RA damper is sequenced with the OA damper, as shown at 106. This means that, when the RA damper is actuated, so is the OA damper, but in an opposite manner. For example, when the system fan is off, the OA damper may be closed and the RA damper is open. When the system fan activates, the OA damper will open to some degree, for example, it may be modulated to 60% open. With the OA damper 60% open, the RA damper is then closed 40% to assure sufficient air supply for the fan and heat exchangers to operate properly and achieve reasonable circulation in an associated controlled space. As a further example, if the RA damper is opened to a greater degree because sufficient ventilation has occurred, the OA damper will then close to a greater degree. One-to-one correspondence is not required. After the mixed air plenum pressure sensor is checked for failure, the method is completed as shown at 108.

Figure 3A:
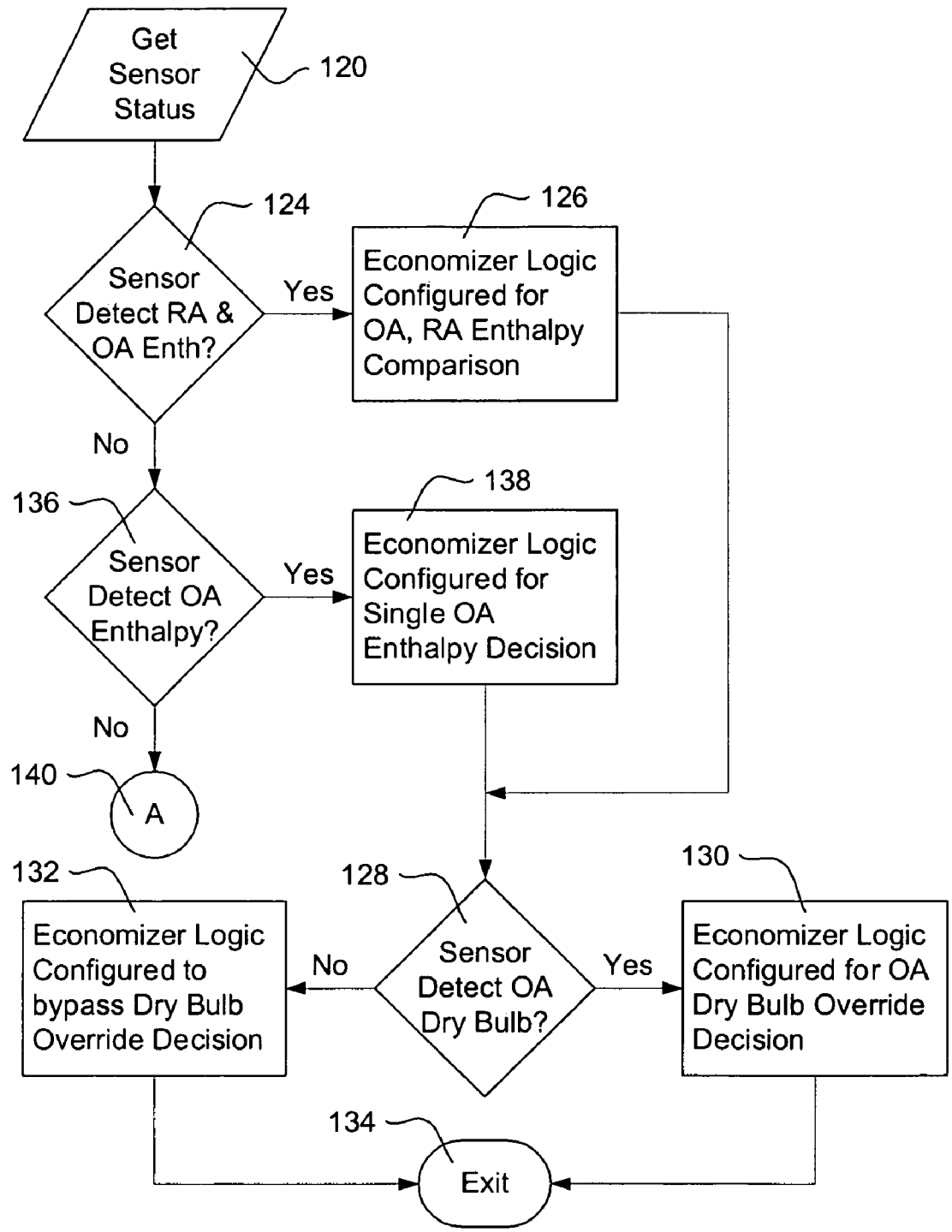
FIGS. 3A-3B are block diagrams showing self configuration for an illustrative HVAC controller as part of an illustrative HVAC operation method.
Figure 3B:
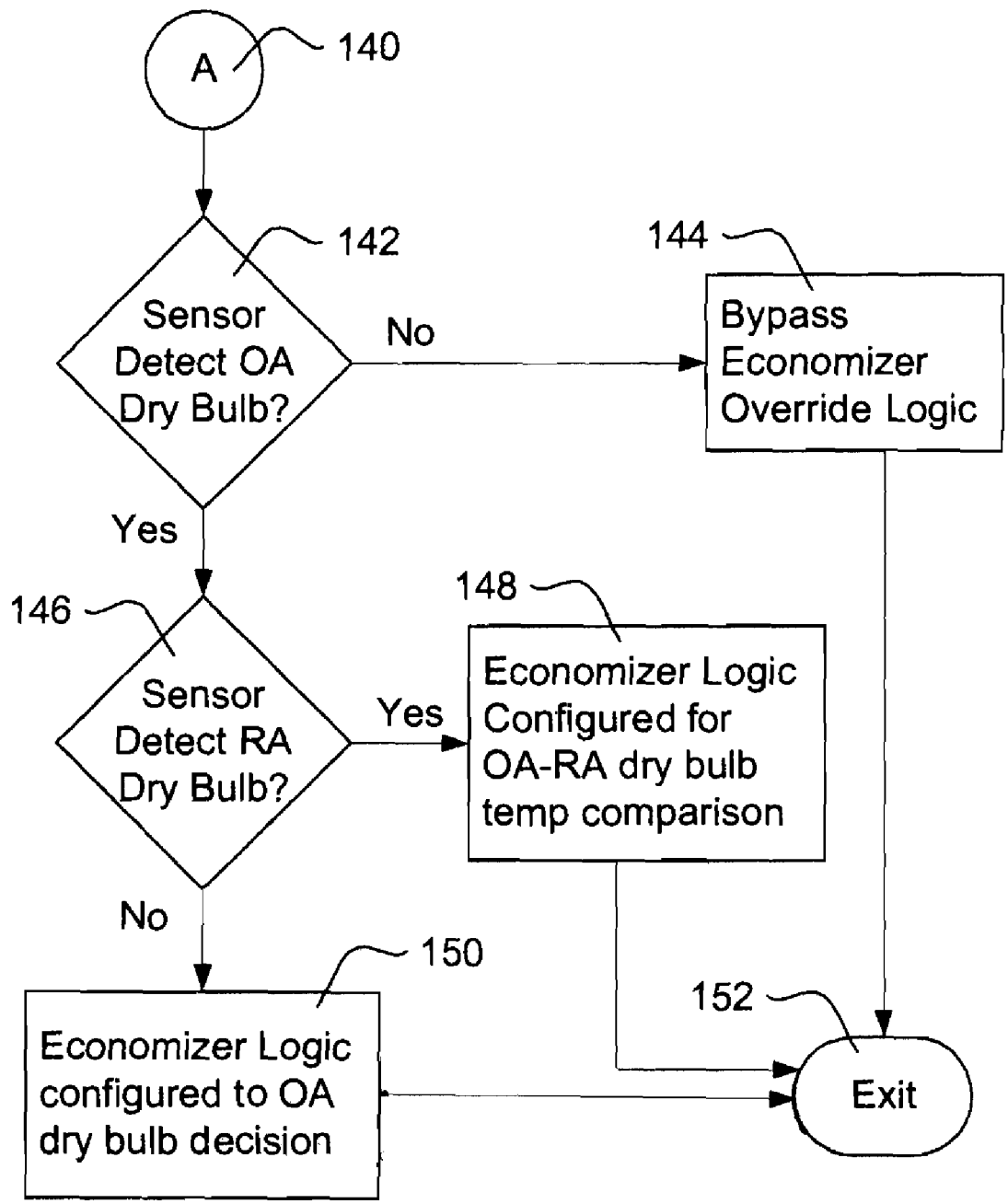

FIGS. 3A-3B are block diagrams showing self configuration for an HVAC controller as part of an illustrative HVAC operation method. The self-configuration begins by getting sensor status, as shown at 120. The sensors for detecting RA and OA enthalpy are checked, as shown at 124. If both sensors are operational, the method includes configuring economizer logic to use a comparison of the OA and RA enthalpies (differential enthalpy), as shown at 126. The method continues at 128 by observing whether an operational OA dry bulb temperature sensor is detected. If so, then the economizer logic can be configured for OA dry bulb override decisions, as shown at 130 and exits as shown at 134. If the OA dry bulb temperature sensor is not detected, or is not operational, the method includes configuring the economizer logic to bypass a dry bulb override decision, as shown at 132, and exits as shown at 134.

Going back to 124, sensors for both RA and OA enthalpy cannot be detected (either not provided or not operational), the method continues by checking whether a sensor detecting OA enthalpy is detected, as shown at 136. If so, the economizer logic is configured for a single OA enthalpy decision, as shown at 138. The method again continues with a check of the OA dry bulb sensor at 128, as explained above.

If the OA enthalpy sensor is not detected at 136, the method goes to A 140, continuing in FIG. 3B. From A 140, the method next determines whether a sensor for OA dry bulb temperature is detected and functioning, as shown at 142. If not, then as shown at 144, economizer override logic is bypassed. Again, as before, the assumption in the illustrative method is that free cooling will be used if sensors for disabling free cooling (except, perhaps, a safety sensor in the discharge air plenum which prevents dangerously low plenum temperatures) cannot be used. In a hotter and more humid climate, the opposite assumption may be used, with free cooling disabled when sensors are not available to ensure that free cooling will improve system efficiency.

If the OA dry bulb sensor is detected at 142, the method checks whether an RA dry bulb sensor is detected at 146. If so, the economizer logic is configured to perform an OA-RA dry bulb comparison (differential temperature), as shown at 148. Otherwise, the economizer logic is configured to perform a single OA dry bulb decision using a setpoint. After any of steps 144, 148 and 150, the method completes as shown at exit 152.

It can be seen that parts of the self configuration may overlap aspects shown in the fault tolerance portion of FIGS. 2A-2C. Particularly, the economizer mode may be selected in either portion. The redundancy is shown not because any particular HVAC method requires such redundancy, but because the setting of economizer mode as shown may be performed in each of the illustrated methods.

Figure 4:
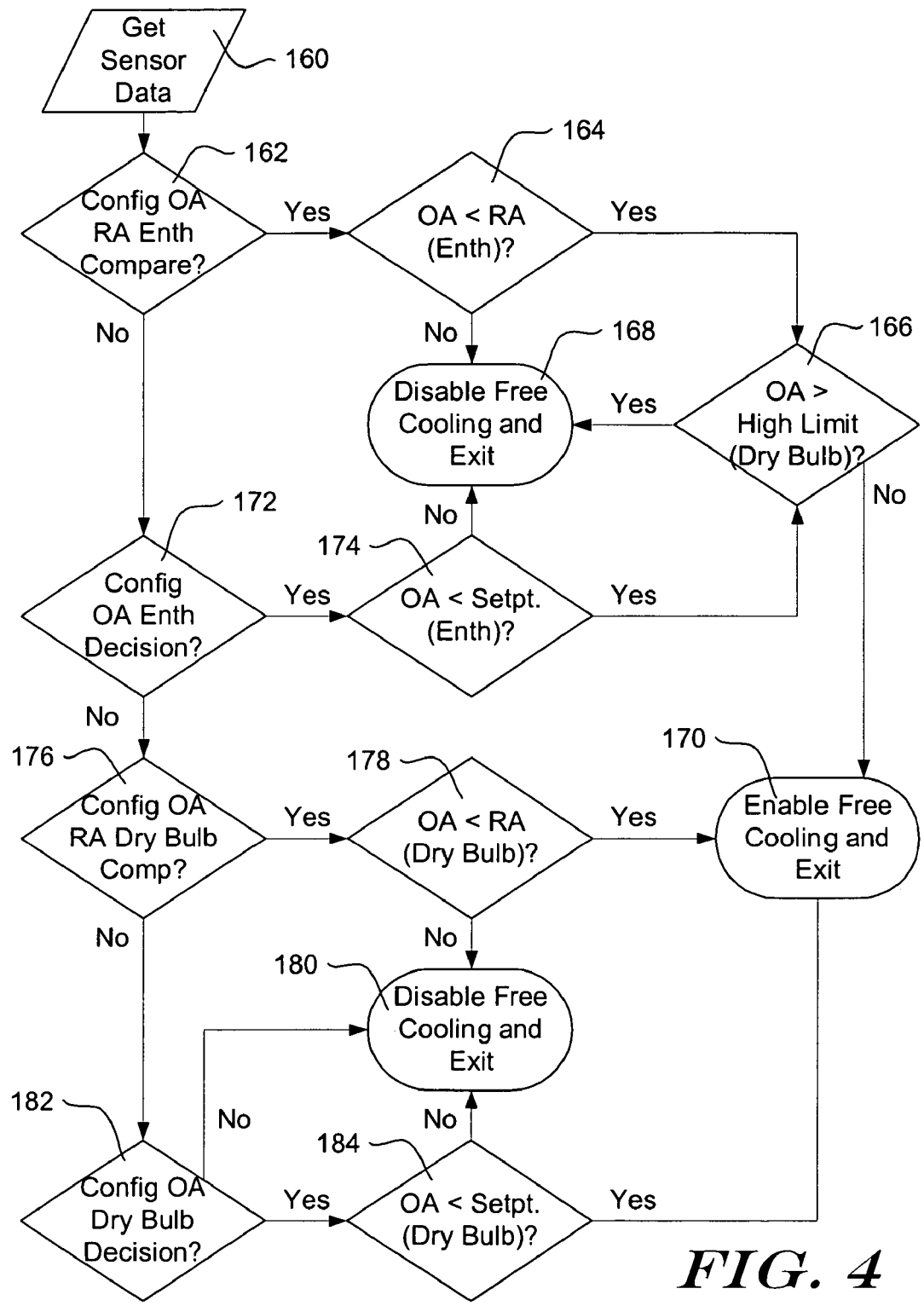
FIG. 4 is a block diagram showing an economizer solution for an illustrative HVAC operation method.

FIG. 4 is a block diagram showing an economizer solution for an illustrative HVAC operation method. The economizer solution method begins by obtaining sensor data as shown at 160. Next is a check to see if the economizer is configured for a dual enthalpy comparison, as shown at 162. If so, a determination is made whether the RA enthalpy exceeds the OA enthalpy, as shown at 164. If so, it is then determined whether the OA dry bulb temperature exceeds a high limit, as shown at 166 (it should be noted that if the OA dry bulb sensor is not functioning or otherwise available, this override may be bypassed either in FIGS. 2A-2C or as shown in FIGS. 3A-3B). If the high limit is exceeded, free cooling is disabled and the economizer exits, as shown at 168. Returning to 166, if the high limit is not exceeded, free cooling (i.e. cooling using the OA damper to infuse outside air for cooling purposes) is enabled and the method exits, as shown at 170. Next, returning to 164, if the RA enthalpy does not exceed the OA enthalpy, then free cooling is disabled and the method is done configuring the economizer, as shown at 168.

Going back to 162, if the economizer is not configured for dual enthalpy decisions, the method checks whether the economizer is configured for single enthalpy (OA enthalpy) decisions, as shown at 172. If so, then the OA enthalpy is compared to a setpoint, as shown at 174. If the OA enthalpy is too high at 174, then free cooling is enabled at 168 and the method exits. Otherwise, if the OA enthalpy is below the setpoint at 174, then the OA dry bulb temperature is compared to the high limit at 166, as before.

Going back to 172, if the economizer is not configured for a single enthalpy (OA enthalpy) decision, then the method determines, as shown at 176, whether the economizer is configured for an OA-RA dry bulb temperature comparison. If so, then the OA dry bulb temperature is compared to the RA dry bulb temperature, as shown at 178. If the RA temperature exceeds the OA temperature, then free cooling is enabled at 170. If the RA temperature does not exceed the OA temperature, then free cooling is disabled at 180 and the method exits.

Going back to 176, if the economizer is not configured for an OA-RA dry bulb comparison, the method determines whether the economizer is configured for an OA dry bulb economizer decision, as shown at 182. If not, the method again ends by disabling free cooling as shown at 180. If the economizer is configured for a single OA dry bulb decision at 182, then the method includes comparing the OA temperature to a setpoint, as shown at 184. If the OA temperature is less than the setpoint, then free cooling is enabled, at 170. If the OA temperature is not less than the setpoint, free cooling is disabled, as shown at 180, since free cooling would likely reduce overall efficiency under outside conditions.

Figure 5A:
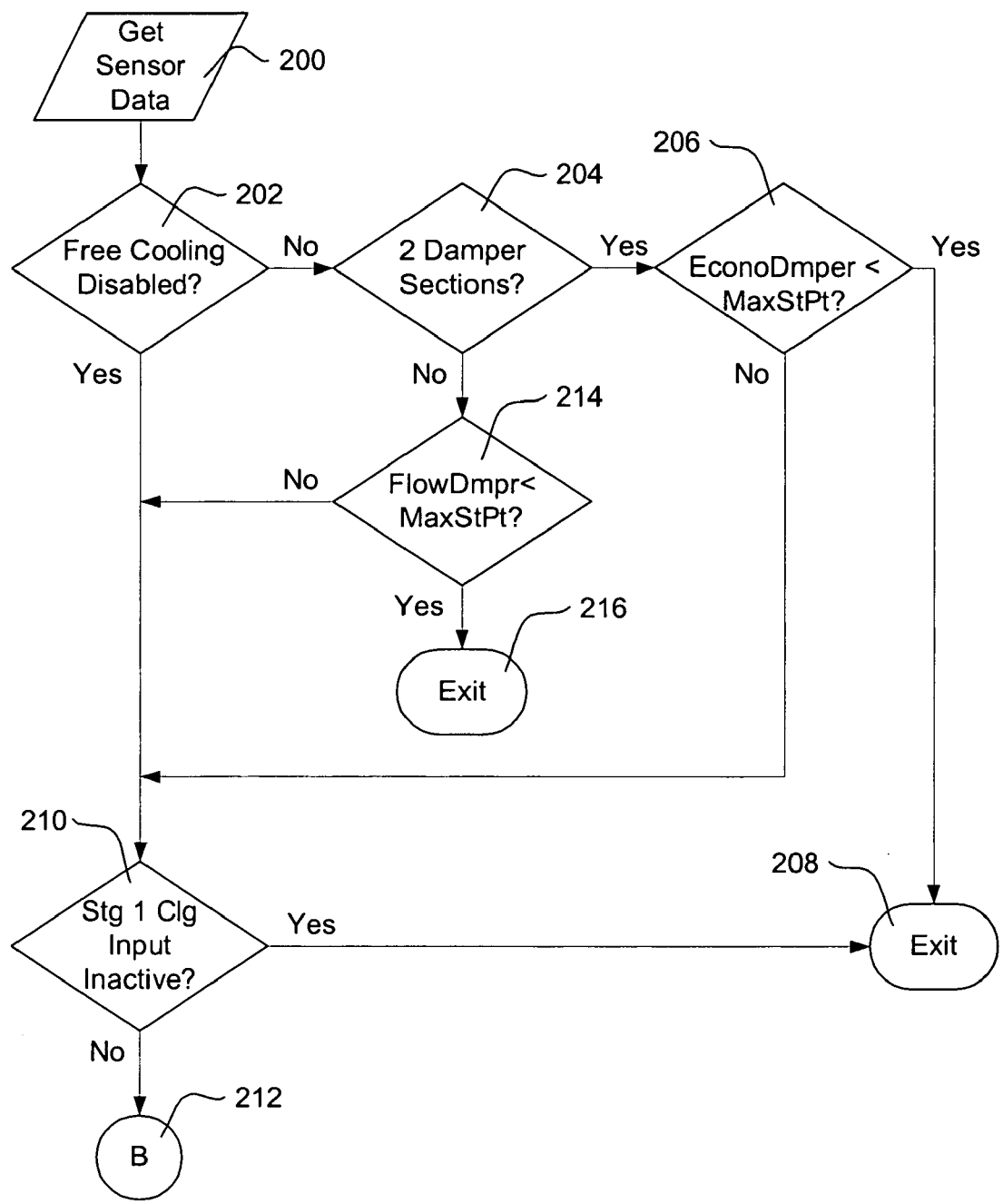
FIGS. 5A-5B is a block diagram showing cooling compressor management for an illustrative HVAC operation method.
Figure 5B:
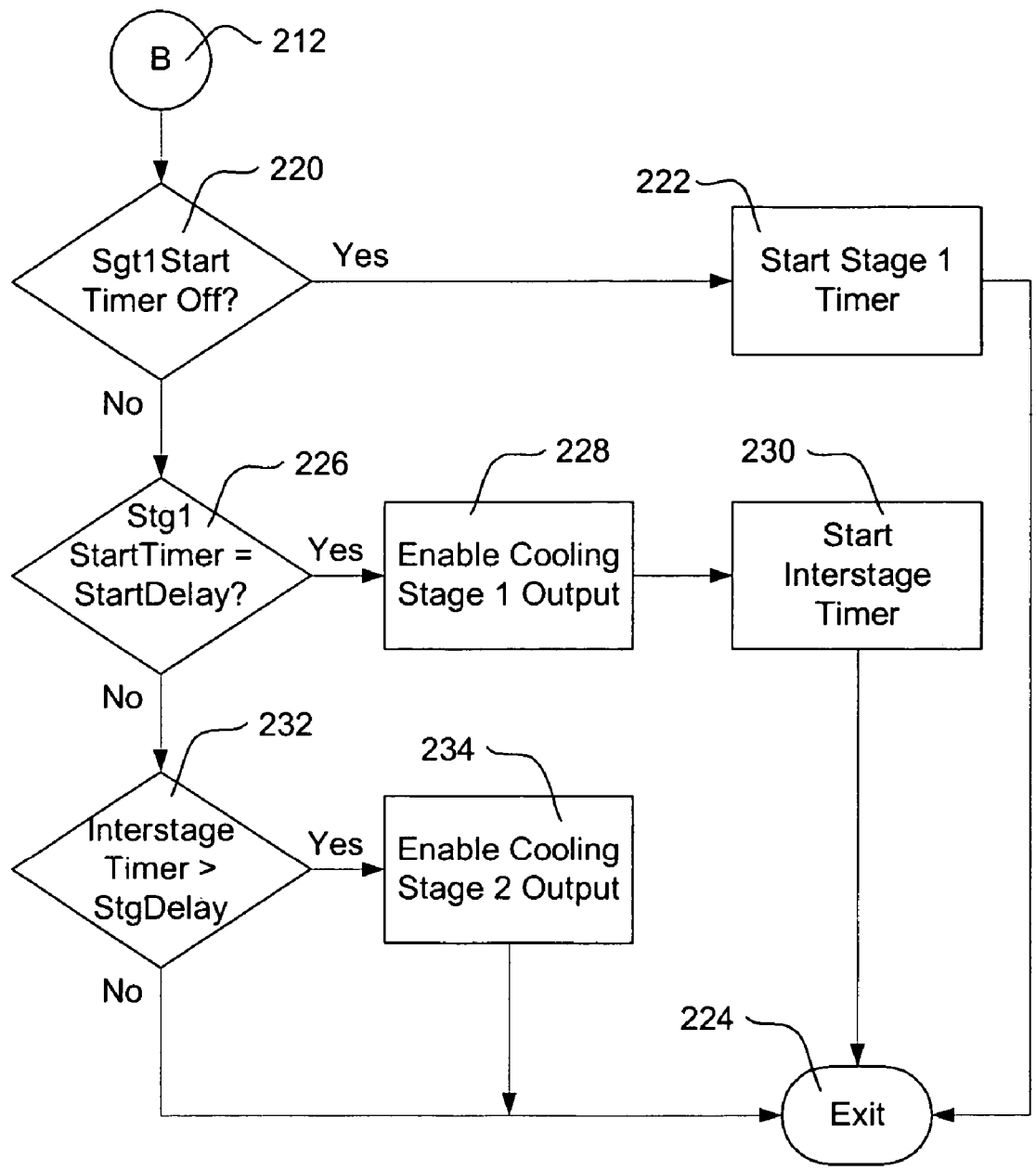

FIGS. 5A-5B show in block form a method of cooling compressor management for an illustrative HVAC operation method. The steps shown in FIGS. 5A-5B presume that a call for cooling has been received from an associated thermostat. The compressor management method begins by getting sensor data, as shown at 200. It is then determined whether free cooling has been disabled, as shown at 202. If not, then it is determined whether there are two damper sections, as shown at 204. For example, in some systems, there may be two OA dampers placed to allow air infusion into the mixed air plenum. A first damper section may be a main economizer and a ventilation damper section. The main economizer can be controlled by cooling demand, while the ventilation damper section is controlled in response to ventilation demands. Added sequencing logic may be provided to accommodate such a multi-section OA damper such that the ventilation damper may open first, followed by the main economizer damper.

If there are two damper sections, then the method continues by reference to the economizer damper, comparing the economizer damper control signal to a maximum economizer setpoint at 206. If the economizer damper control signal has not reached the maximum setpoint, then the method merely exits, as shown at 208, since the economizer has not fully opened the OA damper and therefore more free cooling is available. If the economizer damper has fully opened, as signified by the economizer damper control signal reaching the maximum setpoint, the method goes from 206 to a check on whether the stage 1 cooling input is inactive, as shown at 210. If the stage 1 cooling input is inactive (which may indicate, for example, that the economizer damper is open for ventilation purposes rather than to effect cooling), the method exits at 208. If the stage 1 cooling input is active, then there is an unmet call for cooling from a system thermostat, and the damper is fully open so free cooling capacity is already being fully used. Then, the method continues at B 212 in FIG. 5.

Going back to 204, if there are not two damper sections, then the flow damper control signal is compared to its maximum setpoint, as shown at 214. If the flow damper control signal is below its maximum setpoint, then the method may exit at 216, as there is more free cooling capacity. Otherwise, the free cooling capacity is being fully used, and the method goes, again, to 210.

Turning to FIG. 5B, starting with B 212, the method next determines whether the stage 1 start timer is off, as shown at 220. If the stage 1 start timer is off at 220, then the timer is started as shown at 222, and the method then exits compressor management at 224. If the stage 1 start timer is not off at 220, the method checks whether the stage 1 start timer is equal to the startdelay, as shown at 226. This step allows a delay to be inserted between activation of the free cooling and activation of mechanical cooling. More particularly, the free cooling damper is allowed to open fully, and once fully open, a start delay timer is used to delay mechanical cooling for an additional period.

If the stage 1 start timer has surpassed startdelay, then the method includes enabling cooling by a stage 1 cooling apparatus, as shown at 228. Once the stage 1 cooling apparatus is activated, an interstage timer starts, as shown at 230. The method then exits at 224. In some embodiments, the thermostat output may be monitored to see if cooling is occurring in the controlled space such that, if interior temperatures are dropping, the stage 1 start timer may be reset again to allow more time for free cooling. Or, further, if temperatures are dropping with free cooling and the stage 1 cooling apparatus operating, then the interstage timer may reset, slow, or extend to allow more time for cooling without incorporation of the second stage timer.

If the condition at 226 fails, the interstage timer is compared to an interstage delay variable as well, as shown at 232. If the interstage timer has exceeded interstage delay, cooling with a second stage cooling apparatus is enabled, as shown at 234. If not, the method simply exits at 224. As with each of the delays incorporated in the illustrative methods herein, the interstage timer is compared to the delay variable in step 232 at intervals set by the system cycle time. For example, if the system is set to perform its analysis and modulation at one minute intervals, the interstage timer (assuming step 232 is reached in the method) is compared to the interstage delay variable at one minute intervals. Other cycle times may be used, as desired.

Figure 6:
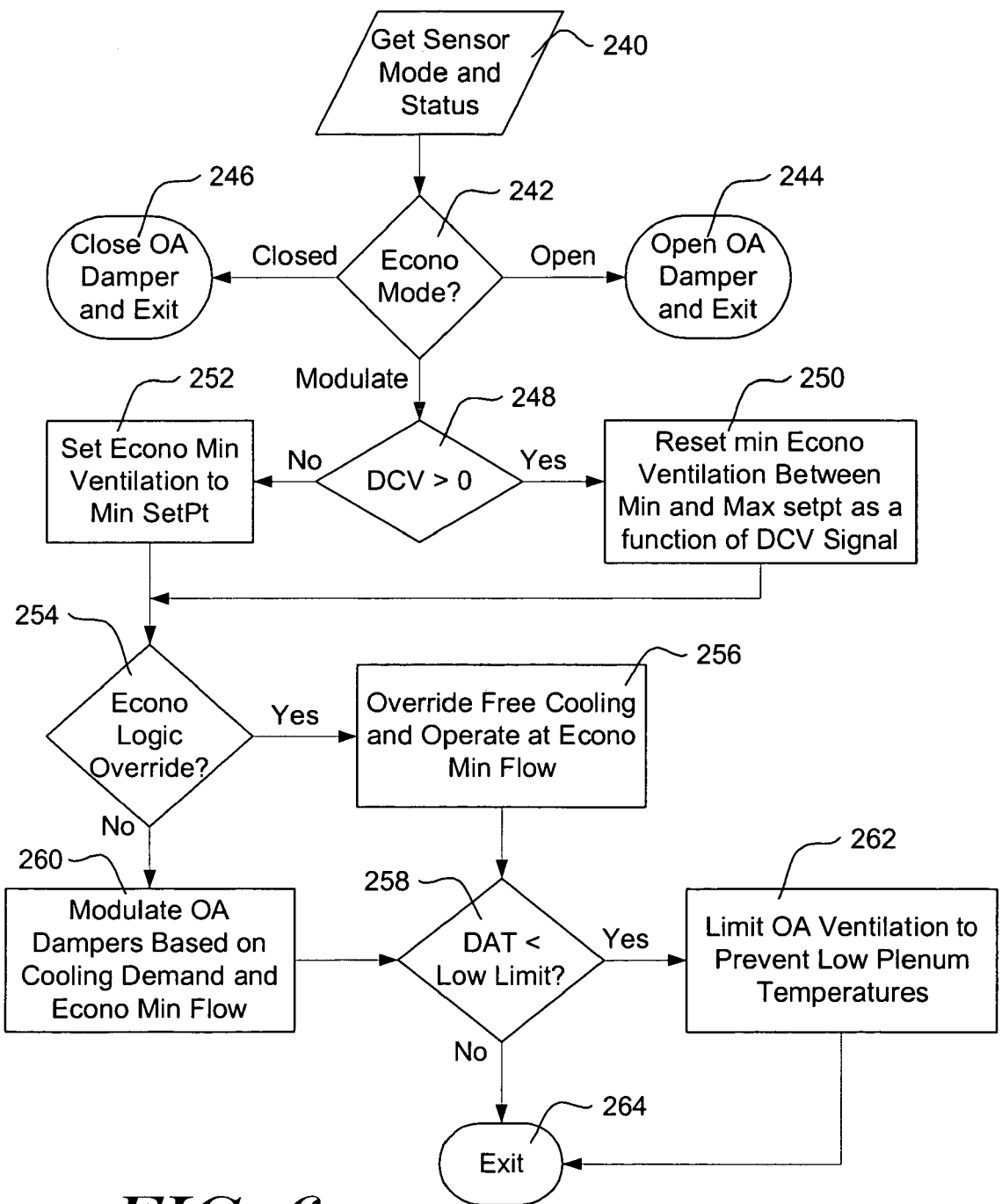
FIG. 6 is a block diagram showing an economizer and indoor air quality coordination solution for an illustrative HVAC operation method.

FIG. 6 is a block diagram showing an economizer and indoor air quality coordination solution for an illustrative HVAC operation method. The illustrative method begins by getting sensor mode and status information, as indicated at 240. Next, the economizer mode is checked, as shown at 242. If the economizer mode is open, then the method includes opening the OA damper and exiting the coordination method, as shown at 244. If the economizer mode is closed, then the OA damper is closed and the method exited, as shown at 246. The economizer mode, in some embodiments, is controlled in response to the status of a smoke detection system, for example, a Life Safety Smoke control command may call for purging by opening (economizer mode=open) the OA damper fully, such that further coordination is overridden. If, instead, a fire is determined to be ongoing, then it may be desirable to quench the fire by starving it of oxygen, calling for the economizer mode to be closed. Also, if the system fan is scheduled to be off, then the economizer mode may be set to be closed.

If, instead, the economizer is set to a modulate mode, the next check is whether demand control ventilation (DCV) is indicated, as shown at 248. If DCV is greater than zero, then the minimum economizer ventilation goal is set between its minimum and maximum setpoints as a function of the DCV signal, as shown at 250. Otherwise, the economizer minimum ventilation level is set to a predetermined minimum setpoint, as shown at 252. In either event, the method goes from step 250 or step 252 to determine whether the economizer logic override has been triggered, as shown at 254. If so, then free cooling is overridden, and operation occurs at the economizer minimum flow, as shown at 256. The discharge air temperature (DAT) is then checked, as shown at 258. Going back to 254, if the economizer logic is not overridden, then the OA dampers are modulated based upon cooling demand and the economizer minimum flow level, as indicated at 260. Next, again, discharge air temperatures are checked at 258. If the discharge air temperature is below a low limit, then OA ventilation is limited to prevent low plenum temperatures. as shown at 262. This may include closing the OA dampers, if needed. The coordination solution is then exited at 264. Likewise, if the discharge air temperature is not below the low limit, the coordination solution is exited at 264. In summary, the coordination solution of FIG. 6 sets an economizer minimum ventilation level based upon Life Safety Override and economizer rules in conjunction with demand ventilation levels.

Figure 7:
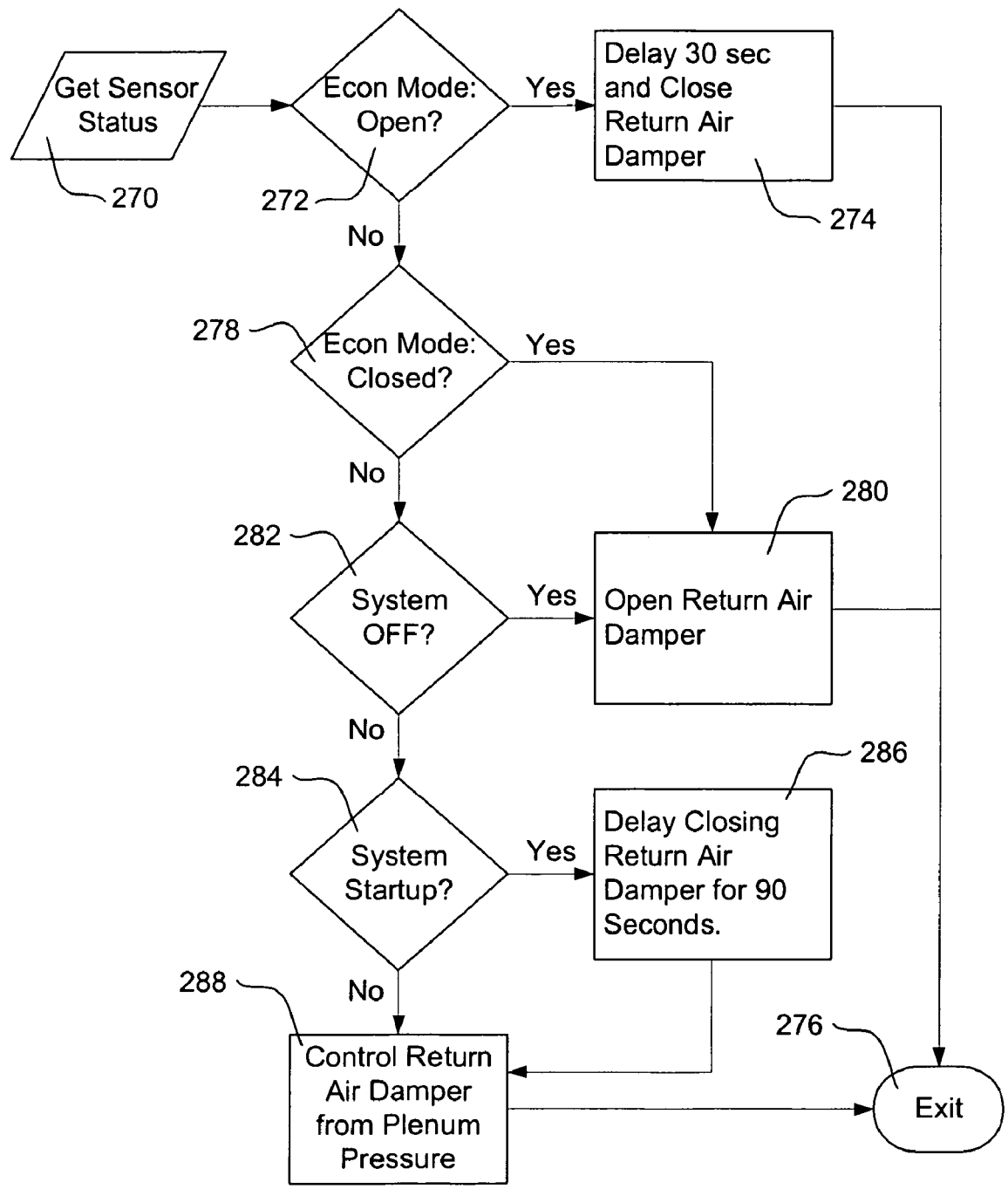
FIG. 7 is a block diagram showing a return air damper control solution for an illustrative HVAC operation method.

FIG. 7 is a block diagram showing a return air damper control solution for an illustrative HVAC operation method. The return air damper control solution begins with getting the sensor status at 270. If the economizer mode is set to open, as noted at 272, the OA damper will be set open, such that the return air damper should be closed. To allow sufficient time for the OA damper to open and avoid strain on the fan and other ventilation components, a 30 second delay before the RA damper is closed is used, as shown at 274. From step 274, the method exits at 276.

If the economizer mode is not open at 272, the method continues at 278 where it is determined whether the economizer mode is closed. If so, the OA damper will be closed and the return air damper is opened to allow air circulation, as shown at 280. The method then exits at 276. If the economizer mode is not closed, then it is determined whether the system is off, as shown at 282. If so, again, the return air damper is opened, as shown at 280, and the method exits at 276.

If the system is not off, then it is determined whether the system is in startup, as shown at 284. If so, the return air damper will be closed, but only after a 90 second delay, as shown at 286. From either step 286, or if the system is not in startup at 284, the return air damper is controlled by reference to plenum pressure, as noted at 288.

Figure 8:
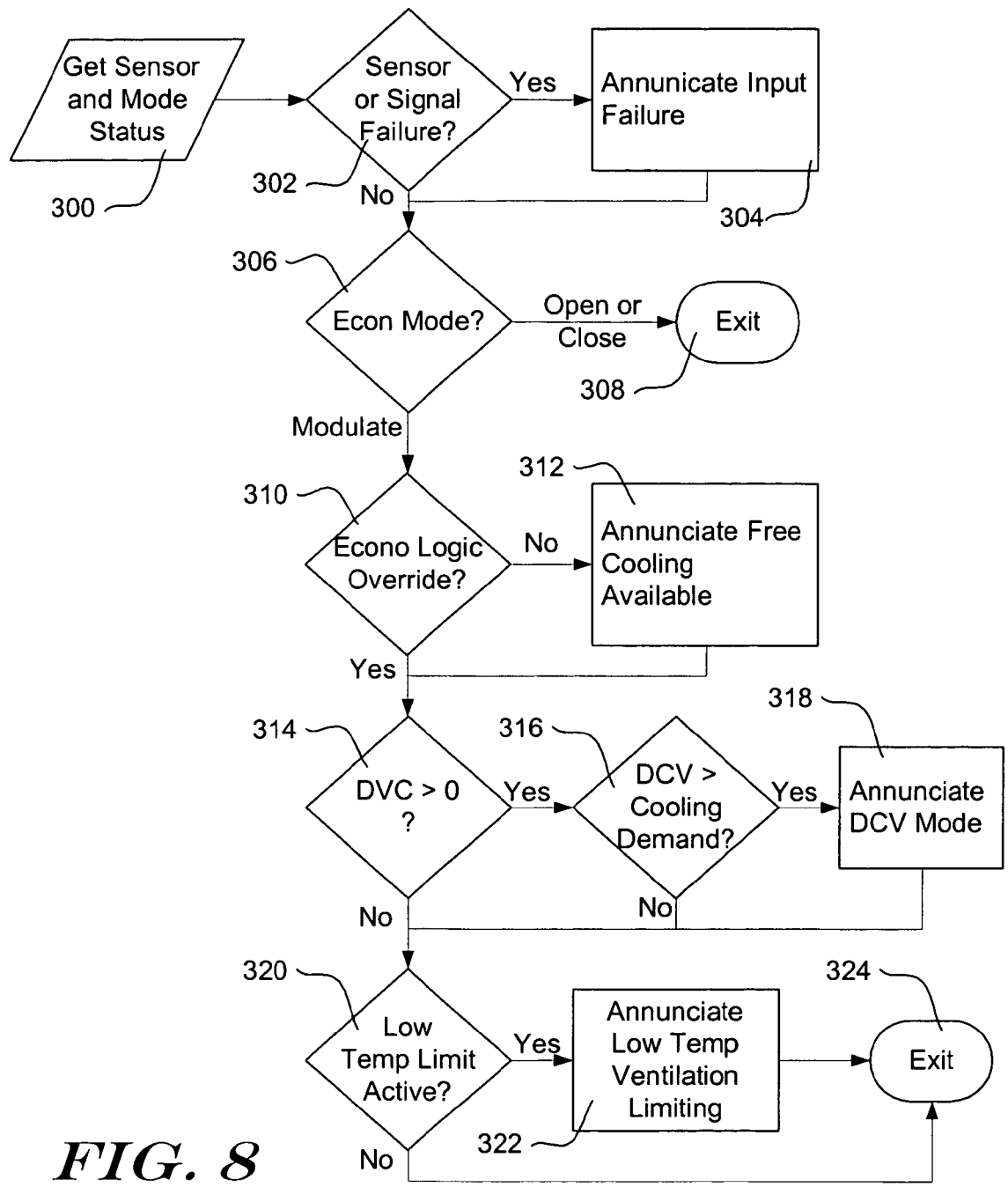
FIG. 8 is a block diagram showing a diagnostic and status annunciation plan for an illustrative HVAC operation method.

FIG. 8 is a block diagram showing a diagnostic and status annunciation plan for an illustrative HVAC operation method. The annunciation plan begins by getting the sensor and mode status, as shown at 300. Next, it is determined whether there are any sensor or signal failures, as shown at 302. If so, an input failure (which may further correspond to the particular sensor or signal that is at fault) is annunciated, as shown at 304.

Next, it is determined whether the system is in an economizer mode and which mode is in use as shown at 306. If the economizer mode is open or closed, the annunciation plan is exited, as noted at 308. Otherwise, it is determined whether the economizer logic has been overridden, as shown at 310. If not, the method includes annunciating that free cooling is available, as shown at 312. From either of 310 or 312, the method then determines whether demand control ventilation has been called for, as shown at 314. If so, it is determined whether the demand control ventilation demand for fresh air exceeds cooling demand, as shown at 316. If so, then it is annunciated that the system is in DCV mode, as shown at 318. The method proceeds to block 320 from whichever of blocks 314, 316 and 318 is appropriate. As shown at 320, the method includes determining whether the low temperature limit is active. If so, then the method includes annunciating that low temperature ventilation is limiting fresh air infusion, as shown at 322, and the method exits, as shown at 324. For example, if OA temperatures are very low, then the amount of ventilation allowed may be limited to avoid low plenum temperatures. Returning to 320, if the low temperature limit is not active, the method simply exits at 324.

Figure 9:
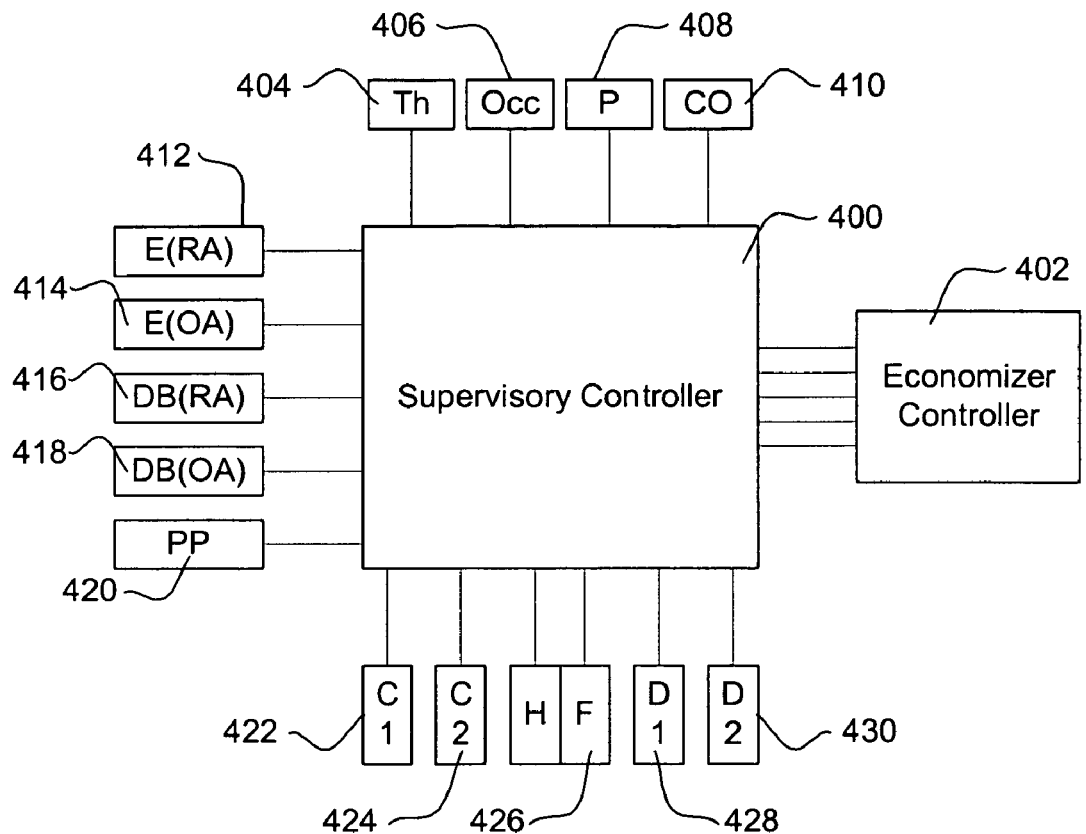
FIG. 9 shows the interconnection of a retrofit controller to an existing HVAC economizer system.

FIG. 9 shows the interconnection of a retrofit controller to an existing HVAC economizer system. More particularly, it can be seen that a supervisory controller 400 controls signals going to and coming from an economizer controller 402. This allows existing economizer controllers to remain in use, since some such controllers may be difficult or expensive to access or replace. The supervisory controller 400 may take inputs from controlled space sensors or detectors including, for example, a thermostat 404, an occupancy sensor 406 (which may be a CO.sub.2 sensor), a particulate sensor 408, and a carbon monoxide sensor 410. The supervisory controller 400 can also receive signals from various system sensors including a return air enthalpy sensor 412, an outside air enthalpy sensor 414, a dry bulb return air sensor 416, a dry bulb outside air sensor 418, and a plenum pressure sensor 420. The number and type of sensors noted is merely illustrative and should not be construed as limiting; for example, other sensors such as a mixed air sensor, a discharge air sensor, or fire and smoke sensors can also be provided.

The supervisory controller 400 also communicates with various system components, including for example, a first stage cooling device 422, a second stage cooling device 424, a heating (furnace) and fan device 426, a first damper 428 and a second damper 430. Again, additional or different components may be provided.

In the illustrative example, the supervisory controller 400 may be equipped with suitable operational circuitry, such as a microcontroller and/or various logic elements, and, if desired, a machine readable memory. The operational circuitry is preferably configured to perform one or more of the methods explained herein. In an illustrative embodiment, the operational circuitry is configured to determine which of several economizer modes is correct for use. The economizer controller 402 may include inputs for controlling economizer modes, and the supervisory controller 400 may provide outputs to the economizer controller 402 to control the economizer mode.

In another embodiment, the supervisory controller 400 may modify outputs provided to the economizer controller 402. For example, if it is determined that an OA enthalpy sensor is disabled, the supervisory controller 400 may simply provide a (relatively) low output to the OA enthalpy sensor input on the economizer controller, which would cause the economizer controller 402 to operate as if the OA conditions are suitable for economizer operation. In a climate where OA conditions typically are suitable for such operation, if the OA enthalpy sensor is disabled, such an assumption may enable operation of the economizer even though a desired input (OA enthalpy) is unavailable.

In yet another embodiment, a supervisory controller 400 enables specialization of other controllers. For example, the economizer controller 402 can be specialized to perform only the manipulations needed for economizer control. This allows the economizer controller 402 to be easily replaced as new methods of economizer control are developed. Further, the supervisory controller 400 may be configured to control dampers and the system fan in response to fire and/or smoke alarm signals, without requiring the economizer controller 402 to handle such tasks. In a further embodiment, a supervisory controller such as controller 400 can be used in conjunction with an economizer controller 402 and a FAV controller, with the economizer controller 402 and FAV controller being "plug-and-play" type devices that are easily swapped out to adjust for changing HVAC goals. For example, FAV controls may change in light of new studies of the health of buildings (and their occupants) making use of certain HVAC controls. Also, if a first brand of FAV and/or economizer controller is configured for use with a first brand of sensor, the FAV/economizer controller and/or sensor may be changed without requiring reconfiguration of the rest of the system.

In yet another embodiment, a controller is provided having a supervisory portion or module and an economizer portion or module. The modules may be realized in hardware or in software. The supervisory module may be configured such that the economizer module is disabled under certain conditions, for example, when one or more sensors providing data to the economizer module are unavailable or not functioning.

Figure 10:
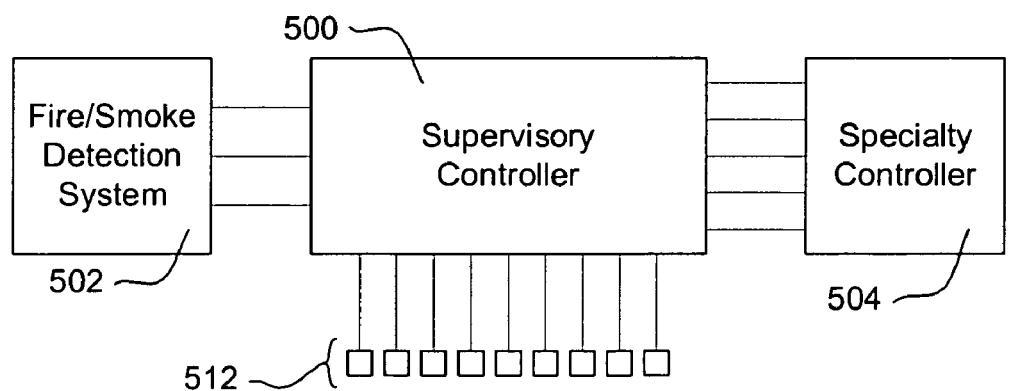
FIG. 10 shows the interconnection of a supervisory controller with a specialty controller and fire/smoke detection system.

FIG. 10 shows the interconnection of a supervisory controller with a specialty controller and fire/smoke detection system. A supervisory controller receives signals from a fire/smoke detection system, and controls the use of a specialty controller 504. The specialty controller may be, for example, a controller configured for performing economizer, FAV, or other specialized HVAC functions.

In recognition of the fact that control strategies for certain specialized HVAC functions are constantly changing, the present invention further includes embodiments of a system and/or supervisory controller as shown. The supervisory controller 500 controls the interaction of the specialty controller 504 with system components 512. This control may include, for example, providing a signal to the specialty controller 504 in place of a disabled or unavailable system sensor, providing a signal to annunciate a failure of a system component 512, modifying output signals from the specialty controller 504 to compensate for a failure of a system component, or overriding the specialty controller 504 under certain conditions. For example, if the fire/smoke detection system 502 indicates that a fire is occurring, the ventilation commands of a specialty controller 504 may be overridden to cut off the air supply to an area where a fire is occurring to aid in fire mitigation and to prevent the spread of smoke throughout a facility. Further, if the fire/smoke detection system 502 detects smoke but not fire, the supervisory controller 500 may execute commands for a purge sequence to evacuate smoke from the controlled space using the system components 512.

Those skilled in the art will recognize that the present invention may be manifested in a variety of forms other than the specific embodiments described and contemplated herein. Accordingly, departures in form and detail may be made without departing from the scope and spirit of the present invention as described in the appended claims.

What is claimed is:

1. An HVAC controller for use in an HVAC system, the HVAC system including:
   a fan, cooling equipment, and fresh air ventilation components;
   a return air enthalpy sensor for sensing system return air enthalpy; and
   an outside air enthalpy sensor for sensing outside air enthalpy;
   a dry bulb sensor disposed to measure outside air temperature, wherein the dry bulb sensor is distinct from the outside air enthalpy sensor;
   the HVAC controller configured to receive signals from the return air enthalpy sensor, the outside air enthalpy sensor and the dry bulb sensor, the HVAC controller adapted to perform the following steps:
   determine whether the return air enthalpy sensor and the outside air enthalpy sensor are both functioning;

if both the return air enthalpy sensor and the outside air enthalpy sensor are both functioning, operating the HVAC system using an economizer mode having a differential enthalpy economizer decision process;

if the return air enthalpy sensor and the outside air enthalpy sensor are both not functioning, operating the HVAC system using a second mode that does not include a differential enthalpy economizer decision process;

determine whether the dry bulb sensor is functioning;

if the outside air enthalpy sensor is not functioning, and if the dry bulb sensor is functioning, operating the HVAC system using an economizer mode having an outside air dry bulb decision process; and wherein the HVAC controller is further adapted such that, if the outside air enthalpy sensor is functioning:

if the dry bulb sensor is not functioning, operating the HVAC system using an economizer mode not having an outside air dry bulb override decision process; or if the dry bulb sensor is functioning, operating the HVAC system using an economizer mode including an outside air dry bulb override decision process.

2. The HVAC controller of claim 1 wherein the HVAC system further comprises an economizer controller, the HVAC controller further comprising inputs and outputs configured for coupling with the economizer controller.

3. A method of operating an HVAC system comprising:

determining whether an enthalpy sensor disposed for sensing return air enthalpy is operational;

determining whether an enthalpy sensor disposed for sensing outdoor air enthalpy is operational;

if both sensors are operational, operating the HVAC system using an economizer mode using dual enthalpy analysis;

if the sensor disposed for sensing outdoor air enthalpy is operational and the sensor disposed for sensing return air enthalpy is not operational, operating the HVAC system using an economizer mode using a single enthalpy analysis;

determining whether a dry bulb sensor disposed for sensing outdoor temperature is operational; and if the sensor disposed for sensing outdoor temperature is not operational and the sensor disposed for sensing outdoor air enthalpy is operational, disabling an outside air temperature override from any economizer mode in use.

4. The method of claim 3 further comprising:

if the sensor disposed for sensing outdoor air enthalpy is not operational and the sensor disposed for sensing outdoor temperature is operational, operating the HVAC system using an economizer mode using an outdoor temperature, but not enthalpy, process.

5. A method of operating an HVAC system comprising:

determining whether an enthalpy sensor disposed for sensing return air enthalpy is operational;

determining whether an enthalpy sensor disposed for sensing outdoor air enthalpy is operational;

if both sensors are operational, operating the HVAC system using an economizer mode using dual enthalpy analysis;

if the sensor disposed for sensing outdoor air enthalpy is operational and the sensor disposed for sensing return air enthalpy is not operational, operating the HVAC system using an economizer mode using a single enthalpy analysis; and if the sensor disposed for sensing outdoor air enthalpy is not operational and a sensor disposed for sensing outdoor temperature, which is distinct from the enthalpy sensor for sensing outdoor air enthalpy, is operational, operating the HVAC system using an economizer mode using an outdoor temperature, but not enthalpy, process.

6. A controller for an HVAC system, the controller having inputs and outputs for receiving information from and sending commands to components of an HVAC system, the HVAC system including one or more sensors, a fan, a return air path controlled by a return air damper, an outside air path controlled by an outside air damper, and a mixed air path that includes air from the return air path and the outside air path, the controller configured to perform the following steps:

determining whether at least selected sensors of the HVAC system are operational;

if so, controlling the outside air damper and the return air damper using a first method; and if not, controlling the outside air damper and the return air damper using a second method, wherein the first method is different from the second method;

wherein the at least selected sensors include a mixed air pressure sensor for sensing the pressure in the mixed air path.

* * * * *